United States Patent Office 3,509,118
Patented Apr. 28, 1970

3,509,118
DIOLS OF POLY(BUTADIENE MONOXIDE)
Edwin J. Vandenberg, Foulk Woods, Del., assignor to Hercules Incorporated, Wilmington, Del., a corporation of Delaware
No Drawing. Continuation-in-part of application Ser. No. 298,434, July 29, 1963. This application Aug. 16, 1965, Ser. No. 480,089
Int. Cl. C08f 7/12
U.S. Cl. 260—88.3
4 Claims

ABSTRACT OF THE DISCLOSURE

Diols of both crystalline and amorphous poly(butadiene monoxide) are described, wherein the hydroxyls are attached to terminal carbons of the polymer chain and the diol has a molecular weight of 500 to 20,000.

This application is a continuation-in-part of my copending application Ser. No. 298,434, filed July 29, 1963, now U.S. 3,337,487.

This invention relates to new dihydroxy polyethers, and more particularly to diols of poly(butadiene monoxide).

As is known from the prior art, both crystalline and amorphous high molecular weight polymers of butadiene monoxide can be prepared by polymerizing butadiene monoxide under certain selected conditions, such as by using an organic diluent and an organoaluminum catalyst.

Now in accordance with this invention it has been found that these prior art crystalline and amorphous polymers can be cleaved to produce polyethers having a terminal hydroxyl group at each end of the polymer chain. These new hydroxy-ended polyethers may be defined as diols of poly(butadiene monoxide) wherein each of the hydroxyls is terminal. These new diols have a number average molecular weight of from about 500 to about 20,000, and preferably of from about 1,000 to about 10,000, and can be either crystalline or amorphous, depending on the structure of the long chain polymer which is cleaved.

The high molecular weight poly(butadiene monoxide) is readily cleaved by reacting it with an organometallic compound of an alkali metal, and the resulting cleavage product is then treated with aqueous acid to hydrolyze the end groups to hydroxyl groups, and produce the hydroxyl-ended diols of poly(butadiene monoxide) of this invention.

The theory of this invention is illustrated by the following equations for the cleavage of poly(butadiene monoxide) with an organolithium compound (LiR), wherein abstraction of hydrogen on a carbon atom beta to the ether linkage leads to cleavage. As will be seen, there are, for any given ether linkage in the polymer chain of poly(butadiene monoxide), three positions wherein a hydrogen is attached to a carbon beta to the ether linkage, hence there are three possible chain cleavage reactions, two involving cleavage on the left side of the ether linkage and one involving cleavage on the right side of the ether linkage. The three cleavage reactions involving these three beta hydrogens ($\beta_1$, $\beta_2$ and $\beta_3$) are shown by Equations 1, 2 and 3 below. R represents the remainder of the polymer chain in these equations. Additionally, Equations 4 and 5 show the types of cleavage which can occur when more than one type of beta hydrogen and both left and right side cleavage are involved. Obviously, in any one cleavage reaction there will undoubtedly take place all of these various types of cleavages. Consequently, the end product will be a mixture of these cleavage products. As will be seen from these equastions, under some conditions, part of the end groups in the cleavage product contain double bonds, e.g., 1,3-butadienyl in Product A, 1,2-butadienyl in Product B, and sec-1,3-butadienyl in Product C. The 1,3-butadienyl and sec-1,3-butadienyl end groups are readily hydrolyzed to hydroxyl end groups by acid washing, as shown in Equations 9 and 10. The 1,2-butadienyl end groups isomerize under the influence of the LiR' or LiOR present in the reaction mixture to 1,3-butadienyl end groups which are readily converted to hydroxyl end groups by acid hydrolysis. Under other conditions, e.g., with excess organometallic, the double bond end groups can be further cleaved to convert them directly to LiO— end groups (as shown by Equations 6, 7 and 8), which are readily converted to hydroxyl end groups by water washing as shown in Equation 11.

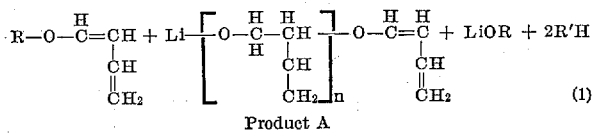

Product A  (1)

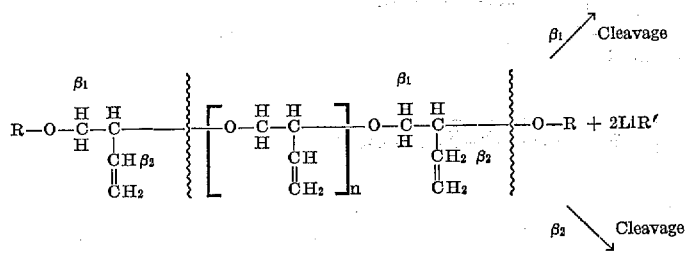

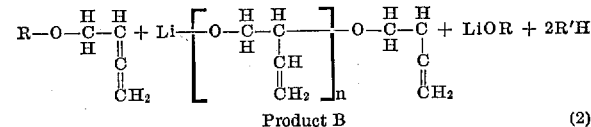

Product B  (2)

Right Side Cleavage
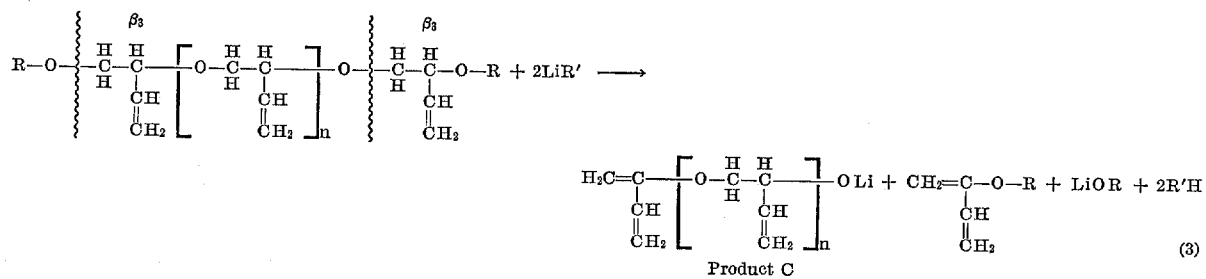
(3)
Left Side and Right Side Cleavage Involving $\beta_1$ and $\beta_2$ Hydrogens
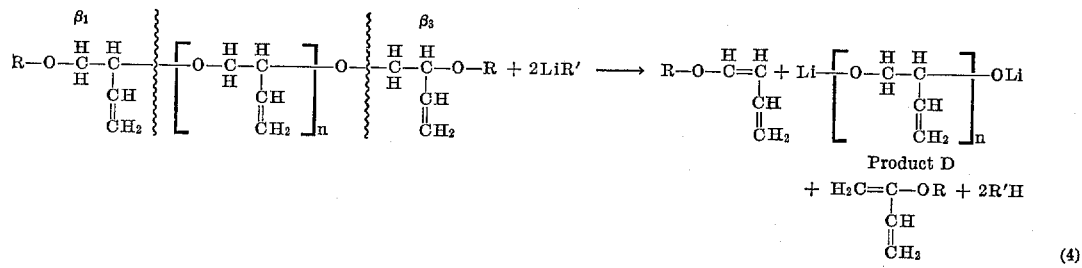
(4)
Left Side and Right Side Cleavage Involving $\beta_2$ and $\beta_3$ Hydrogens
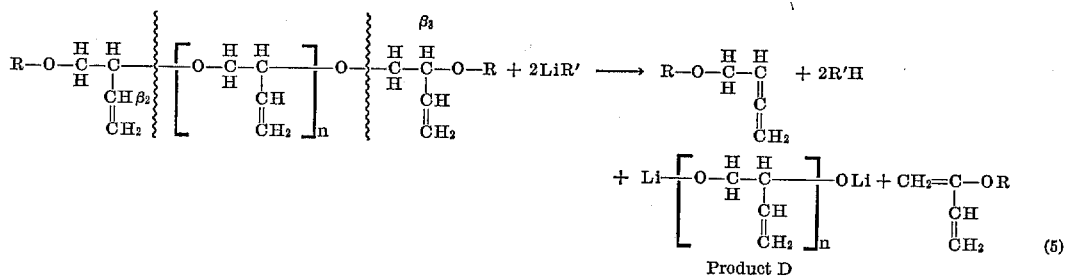
(5)
PRODUCT A
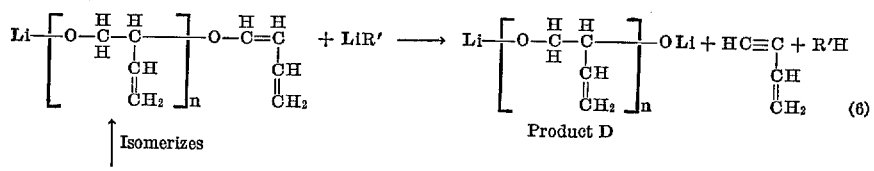
(6)
PRODUCT B
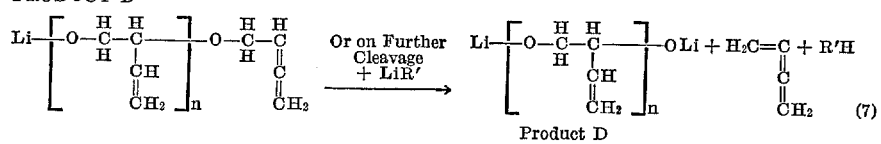
(7)
PRODUCT C
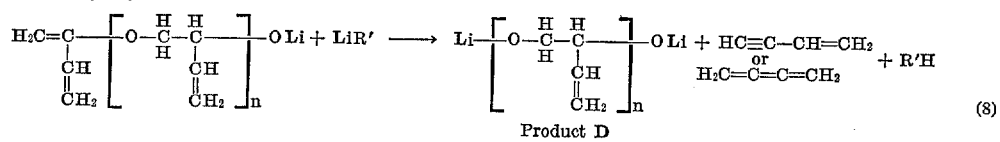
(8)
Hydrolysis of Product A
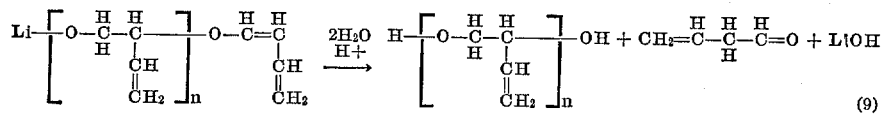
(9)
Hydrolysis of Product C
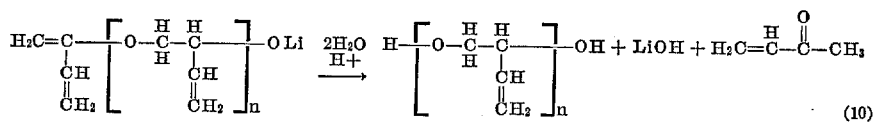
(10)

Hydrolysis of Product D

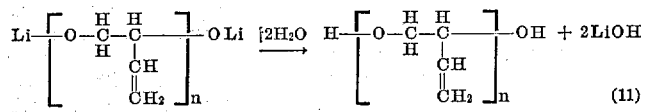

(11)

The cleavage reaction is carried out by reacting the high molecular weight poly(butadiene monoxide) with an organometallic compound of an alkali metal. Any organometallic compound of an alkali metal, i.e., lithium sodium, potassium, rubidium or cesium, can be used. The organo moiety will preferably be a hydrocarbon group, as for example, an alkyl, aryl, alkenyl, alkynyl, cycloalkyl, cycloalkenyl, or aralkyl, etc., group. Exemplary of the alkyl metal organometallic compounds that can be used are methyllithium, ethyllithium, isopropyllithium, n-butyllithium, isobutyllithium, tert-butyllithium, amyllithium, decyllithium, octadecyllithium, cyclohexyllithium, cyclohexenyllithium, phenyllithium, naphthyllithium, vinyl lithium lithium acetylide, methylsodium, ethylsodium, propylsodium, isopropylsodium, the butyl sodiums, amylsodium, dodecylsodium, benzylsodium, isopropenylsodium, allylsodium, octadecenylsodium, butadienylsodium, isoprenylsodium, butylrubidium, butylcesium, methyl-, ethyl-, propyl- and the butylpotassiums, allylpotassium, octylpotassium, phenylpotassium, cyclopentylpotassium, cyclohexenylpotassium, etc. The amount of the organometallic compound used will depend upon the amount of the cleavage desired, one molecule of the organometallic being required for each cleavage, i.e., per two chain ends. Thus, the amount of organometallic compound can vary from about 1% up to a large excess, as for example, 5 to 10 times the weight of the polymer being cleaved, but preferably will vary from about 1% to about 100% by weight of the polymer being cleaved.

The cleavage reaction can be carried out in the absence of a diluent, i.e. in a bulk process, but preferably is carried out in a diluent, which may be a solvent for the polymer being cleaved or which may serve only as a dispersant for the polymer. Any organic liquid diluent that is inert under the reaction conditions can be used, as for example, aromatic hydrocarbons such as benzene, toluene, xylene, etc., aliphatic and cycloaliphatic hydrocarbons such as hexane, n-heptane, cyclohexane, etc., and mixtures of such hydrocarbons, as for example, petroleum ether gasoline, etc. Diluents that are capable of reaction with the organometallic compound (or other cleaving agent), as for example, ethers, can also be used provided that the rate of reaction of the cleaving agent with the polymer being cleaved exceeds the rate of reaction with the diluent. The concentration of the polymer in the diluent can vary from a fraction of about 1% up to an essentially diluent-free system. As already mentioned, the polymer can be dissolved in the diluent or a slurry of the polymer in a diluent can be used. Generally, it is preferred to use conditions such that the polymer solution or dispersion is stirrable. Usually the polymer concentration will be in the 2 to 50% range. As noted above, the process can be operated in the absence of a diluent, particularly in the case of polymers which on cleavage become more and more fluid, or by carrying out the process in an extruder after which the cleaved fluid product can be handled in more conventional equipment in a continuous process.

The cleavage reaction can be carried out over a wide temperature range, generally from about −50° C. to about 200° C., depending on the reactivity of the cleaving agent, the stability of the cleaving agent, etc. Preferably, the reaction is carried out at a temperature of from about −20° C. to about 150° C., and more preferably, from about 0° C. to about 125° C. The pressure can be atmospheric, subatmospheric or above atmospheric, if desired. In fact, pressures up to several thousand p.s.i. can be used, if needed, to keep the diluent in the liquid state.

The high molecular weight crystalline and amorphous poly(butadiene monoxide)s that are cleaved to prepare the diols of this invention can be prepared by any desired means. Polyethers of high molecular weight are readily prepared according to the process of my patent U.S. 3,135,705, issued June 2, 1964, using as the catalyst an organoaluminum compound reacted with water and preferably with both water and a chelating agent. A typical catalyst preparation is carried out by reacting a solution of the organoaluminum compound, as for example, triethylaluminum or triisobutylaluminum, in a mixture of n-heptane and ether as solvent, with an equimolar amount of acetylacetone as chelating agent and with 0.5 mole of water per mole of aluminum and agitating the mixture at 30° C. for 16 to 20 hours. The polymerization is typically carried out by injecting the catalyst solution so prepared into a solution of the butadiene monoxide in an inert diluent and agitating the mixture at room temperature or at elevated temperatures for several hours, or longer. Isolation of the polymer will depend on the solubility of the polymer in the reaction diluent, etc.

Preferably the poly(butadiene monoxide) that is cleaved will be one of fairly high molecular weight so that the original end groups in the polymer being cleaved are an insignificant part of the total final end groups, and the individual polymer molecules in the cleaved product will then have hydroxyl end groups on both ends. The polymer being cleaved will preferably have a chain of at least about 100 of said monomer groups and, more preferably, at least about 500. The actual molecular weight of the polymer being cleaved and the number of cleavages per polymer molecule will, of course, depend on the purpose for which the final polymer is to be usde.

The high polymer can be isolated from the polymerization reaction vessel prior to the initiation of cleavage, or the cleavage reaction can be commenced in the same vessel without isolation.

To produce the diols of poly(butadiene monoxide) of this invention, the reaction product of the above described cleavage reaction must be treated to remove the alkali metal ions. This can be easily accomplished by simply washing the reaction mixture with water (basic, neutral or acidic) or with a weak acid solution (aqueous or nonaqueous), as for example, dilute hydrochloric, formic, acetic, oxalic, sulfuric, sulfurous, nitric, sulfaonic or carbonic acids, or the like. With the aqueous acid treatment, any 1,3-butadienyl or sec-1,3-butadienyl, etc., end groups are hydrolyzed to the corresponding hydroxyl end groups.

The hydroxyl-ended polymers of this invention can be prepared in a wide variety of molecular weights, depending on the molecular weight of the starting polymer and the amount of cleavage to which it is subjected. In general, they have number average molecular weights of from about 500 to about 20,000, and preferably of from about 1,000 to about 10,000. These products are diols, having terminal hydroxyl groups on both ends of the polymer chains. The polymeric diols of this invention can be either crystalline or amorphous, depending on the structure of high polymer prior to cleavage.

Because the diol products of this invention have hydroxyl groups at each end of their polymer chains, they can be used in various chain extension reactions. The chain extending agents can be any polyfunctional compound which reacts under appropriate temperature, pressure and catalyst with the hydroxyl groups. They can be di- or polyisocyanates such as m- or p-phenylene diisocyanate, 2,4-toluene diisocyanate, 1,5-naphthyl diisocyanate, methylene di(p-phenyl diisocyanate, hexamethylene diisocyanate, triphenyl methane triisocyanate, etc.; di- or polyepoxides such as Epon resins, as for example, the diglycidyl ether of Bisphenol A, or di- or tri-aziridines, as for example, tris[1-(2 - methyl)aziridinyl)] phosphine oxide, tris(1-aziridinyl) phosphine oxide, or di- or polyanhydrides such as pyromellitic anhydride, or di- or polyimides such as phenylene bis-maleimide, etc. The difunctional chain extending agents are generally used in approximately stoichiometric amount to the hydroxyl chain ends when a linear, soluble high polymer product is desired. When the chain-extending agent contains more than two functional groups and is used in approximately stoichiometric amounts to the hydroxyl chain ends, the product is generally a cross-linked product. Alternatively, a cross-linked network can be obtained by using a combination of a difunctional active chain end polymer with low molecular weight similar polyreactive compounds. Thus, the diols of this invention, having hydroxyls on both ends of the polymer chain, on combination with a polyol such as glycerin, pentaerythritol, trimethylol propane, sorbitol, tetrakis(2-hydroxypropyl) ethylene diamine, or ethylene oxide or propylene oxide adducts of these polyols in combination with the diisocyanate, will yield a cross-linked polyurethane network.

The new diols of poly(butadiene monoxide) of this invention can also be converted to useful polyester and polyamide block copolymers by the usual polyester and polyamide forming reactions, using either a simple monomeric unit such as the phthalic acids or esters, or using preformed polyesters or polyamides with appropriate reactive chain ends. Interfacial polymerization is advantageously used to prepare such materials by using acid chlorides of dicarboxylic acids or of carboxy-ended polyesters of polyamides with the diols. Alternatively, an amine-ended polyamide can be reacted with a chloroformate-ended diol (formed by the reaction of the diol with phosgene) to give a polyether-polyamide block copolymer joined by polyurethane links. The chloroformate-ended diol can also be reacted by interfacial polymerization with hydrazine or simple diamines to form polyurethane type products. The diols can also be end-capped, by reaction with at least two moles of a di- or polyisocyanate, to give a product with reactive isocyanate end groups, which can then be reacted with a diamine, such as hydrazine, ethylenediamine, phenylenediamine, etc., or an amine-ended polyamide, to give block-type copolymers containing urea links which are advantages for increasing the softening point and improving the abrasion resistance of the polymer.

The crystalline diols of this invention can be further modified to yield useful products. For example, they may be reacted in the presence of a base with other epoxides such as ethylene oxide, propylene oxide, butene-1 oxide, etc. Such adducts may be diadducts, i.e., the hydroxyl end groups converted to more reactive hydroxyethyl (ethylene oxide reaction) or hydroxypropyl (propylene oxide reaction) end groups. Such products, because of their reactivity with isocyanates, are especially useful for foam, particularly for the very useful one-shot foam processes. The adducts may consist of large blocks (5 to 100 units) of ethylene oxide, amorphous propylene oxide, amorphous butene-1 oxides, etc. Such block polymers containing the diol units of this invention are unique, and are unusually useful surface-active agents, adhesives, and protective colloids. The ethylene oxide type are especially useful as detergents, dispersing agents, antistatic agents, dyeing aids, additives or coatings for fibers to prevent soil redeposition during laundering, etc.

The diols of poly(butadiene monoxide) of this invention are particularly useful as a result of the presence of the unreacted double bonds present in the side chains of the polymer. Thus, products of normal chain extension reactions of the hydroxyl end groups of the instant diols (including block copolymers thereof with other polyethers which do not contain unreacted double bonds, such as polypropylene glycol, etc.) can be further reacted and modified through these double bonds, such as by cross-linking reactions and other double bond reactions known to be useful with natural rubber and other unsaturated rubbers. For example, such modification can be effected with a wide variety of sulfur-type curing systems.

The presence in the diols of this invention of both hydroxyl end groups and ethylene double bond-containing side chains renders the instant products useful in making a high energy rocket propellant binder, by adding energetic groups such as $N_2O_4$ to the double bonds. Both the crystalline and amorphous diols of poly(butadiene monoxide) also can be modified to prepare useful products by adding halogen, carbon tetrachloride, chloroform, etc., to the double bond side chains.

The following examples illustrate the preparation of the products of this invention. All parts and percentages are by weight unless otherwise indicated. All examples were run under a nitrogen atmosphere. The molecular weight of the polymers is indicated by their reduced specific viscosities (RSV). By the term "reduced specific viscosity" is meant $\eta_{sp}/c$. determined on a 0.1% solution in chloroform at 25° C., unless otherwise indicated. The number average molecular weight (Mn) was determined in benzene (heating to dissolve the polymer when necessary) using a Mechrolab osmometer. The calculated Mn was calculated from the hydroxyl analysis, assuming two hydroxyls per chain. Hydroxyl analysis was determined by infrared analysis. Where the melting point of the polymer is given, it was determined by differential thermal analysis (DTA).

EXAMPLE 1

Fifty (50) parts of butadiene monoxide was polymerized in 400 parts of anhydrous benzene using as the catalyst 2.28 parts triethylaluminum, which has been reacted with 0.5 mole of water per mole and 1.0 mole of acetylacetone per mole of aluminum. The polymerization reaction was carried out for 19 hours at 50° C. The polymerization product was a solid mass, and a total solids sample indicated a 99% conversion to a very tough rubber. The solid mass was then dissolved in 2420 parts of anhydrous benzene, and the solution was freed of unreacted monomer by distilling off, under reduced pressure, 200 parts of the benzene. With the temperature at 30° C., 4.8 parts of lithium butyl in 30 parts of n-hexane was added. An immediate drop in viscosity of the solution occurred. After stirring for 0.5 hour at 30° C., the reaction was shortstopped by adding 20 parts of anhydrous ethanol. The reaction mixture was then stirred for 2 hours with one liter of a 10% aqueous solution of hydrogen chloride. The organic layer was separated, washed neutral with water, and 0.1% of phenyl-$\beta$-naphthylamine, based on the polymer, was added as stabilizer, after which the solvent was removed and the product dried. There was obtained 41.3 parts (84% yield) of a product which was a soft wax at room temperature and was a viscous liquid when hot (80° C.). The product was insoluble in methanol and was soluble in benzene and chloroform. It had an Mn of 1876. Infrared analysis showed it to contain 1.3% hydroxyl and 20% vinyl unsaturation (theory is 20.0%). Thus, the product was a hydroxyl-ented polymer containing all of the vinyl side groups present in the original polymer.

Fifteen (15) parts of the above crude product was agitated with 214 parts of ether. The ether-insoluble fraction was collected, washed twice with ether, stabilized with 0.01% phenyl-$\beta$-naphthylamine and dried. It amounted to 4.11 parts (27% yield) and was a white, crystalline solid having an Mn of 13,917. Infrared analysis showed it to contain 0.2% hydroxyl and 21±1% vinyl unsaturation with no indication of any other unsaturation. It had a Kemp bromine number of 225 (theory 229) and a melting point of 75° C. The ether-soluble fraction was recovered and dried. It amounted to 10.3 parts and was a soft solid having an Mn of 1589. Infrared analysis showed it to contain 1.7% hydroxyl (Mn calculated of 2000) and 20% vinyl unsaturation. It had a Kemp bromine number of 216.

EXAMPLE 2

The procedure of Example 1 is repeated in this example except that the 4.8 parts of lithium butyl in 30 parts of n-hexane used in Example 1 is replaced here by 10.0 parts of tert-butyl lithium in 60 parts of n-hexane. Forty (40) parts of anhydrous ethanol is used as the reaction shortstop in this example. The cleaved polymer product is 40 parts of soft wax (at room temperature), which is soluble in benzene and chloroform and largely insoluble in methanol. The product has an Mn of 900. Infrared analysis shows it to contain 3.6% hydroxyl and 20% vinyl unsaturation. The calculated Mn (from hydroxyl groups) is 950.

This product is then separated into an ether-soluble polymer fraction (75% of total polymer) and an ether-insoluble polymer fraction (25% of total polymer) by the procedure described in Example 1. The ether-insoluble fraction is a white crystalline solid, having an Mn of 2000. Infrared analysis indicates a hydroxyl content of 1.6% (Mn calculated of 2100), and 20% vinyl unsaturation. This fraction has a melting point of 63° C. The ether-soluble fraction is a viscous liquid having an Mn of 685. Infrared analysis of this fraction indicates 4.8% hydroxyl groups (Mn calculated of 710) and 20% vinyl unsaturation.

EXAMPLE 3

In this example, a mixture of 106 parts of the purified ether-insoluble fraction of the crystalline diol prepared in Example 2 (Mn calculated=2100) and 45.6 parts of tolylene diisocyanate (an 80:20 mixture of the 2,4- and 2,6-isomers) is heated to 120° C. over a period of two hours to give a prepolymer which is a soft waxy solid at room temperature. A mixture of 3.82 parts of water and 1.06 parts of silicon oil is then added to the prepolymer, with high speed stirring, causing foaming to occur with a fair exotherm. The foam so produced is cured for ten minutes at 100° C. The resulting foam is strong, tough and somewhat flexible. It has a uniform cell structure, and a density of five pounds per cubic foot.

What I claim and desire to protect by Letters Patent is:

1. As a new composition of matter, a diol of poly(butadiene monoxide), wherein each of the hydroxyl groups is attached to a terminal carbon of the polymer chain, said diol having the formula

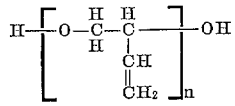

where $n$ is a whole number such that the diol has a number average molecular weight between about 500 and about 20,000.

2. The product of claim 1 wherein said diol has a number average molecular weight between about 1,000 and about 10,000.

3. The product of claim 1 wherein said composition is a crystalline diol of poly(butadiene monoxide).

4. The product of claim 1 wherein said composition is an amorphous diol of poly(butadiene monoxide).

References Cited

UNITED STATES PATENTS

| | | |
|---|---|---|
| 2,570,601 | 10/1951 | Schmerling. |
| 3,175,997 | 3/1965 | Hsieh. |
| 3,294,658 | 12/1966 | Atchison et al. |

HARRY WONG, JR., Primary Examiner

U.S. Cl. X.R.

149—74; 260—33.6, 33.2, 47, 887, 77.5, 873, 857, 75, 2.5, 45.9